United States Patent
Molisch et al.

(10) Patent No.: US 11,737,129 B2
(45) Date of Patent: Aug. 22, 2023

(54) COMMUNICATION TECHNIQUES USING QUASI-STATIC PROPERTIES OF WIRELESS CHANNELS

(71) Applicant: Cohere Technologies, Inc., Santa Clara, CA (US)

(72) Inventors: Andreas Molisch, Santa Clara, CA (US); Ronny Hadani, Santa Clara, CA (US); Robert Fanfelle, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 112 days.

(21) Appl. No.: 17/450,498

(22) Filed: Oct. 11, 2021

(65) Prior Publication Data

US 2022/0141841 A1   May 5, 2022

Related U.S. Application Data

(63) Continuation of application No. 16/606,164, filed as application No. PCT/US2018/028926 on Apr. 23, 2018, now Pat. No. 11,147,087.

(Continued)

(51) Int. Cl.
*H04W 72/12* (2023.01)
*H04W 72/542* (2023.01)
(Continued)

(52) U.S. Cl.
CPC ........ *H04W 72/542* (2023.01); *H04B 17/309* (2015.01); *H04L 5/0007* (2013.01);
(Continued)

(58) Field of Classification Search
CPC .......................... H04W 72/542; H04W 72/566; H04L 5/0007; H04L 5/0048; H04L 5/0226; H04L 5/025; H04B 17/309
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| WO | 2011150315 | 12/2011 |
| WO | 2013148546 | 10/2013 |

(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.

(Continued)

*Primary Examiner* — Kevin D Mew
(74) *Attorney, Agent, or Firm* — Paradice & Li LLP

(57) ABSTRACT

Methods, devices and systems for communication techniques that use the quasi-static properties of wireless channels are described. One example method to improve communication performance includes receiving a set of pilots over a transmission channel between the wireless communication apparatus and a far-end communication apparatus, the transmission channel comprising a first portion that is time-invariant and a second portion that is time-variant, processing the received set of pilots to generate an estimate of the first portion, processing the received set of pilots to generate an estimate of the second portion, and performing a communication based on a channel state information that is a weighted combination of a first term based on the estimate of the first portion and a second term based on the estimate of the second portion.

20 Claims, 8 Drawing Sheets

Related U.S. Application Data

(60) Provisional application No. 62/488,663, filed on Apr. 21, 2017.

(51) Int. Cl.

| | | |
|---|---|---|
| *H04B 17/309* | (2015.01) | |
| *H04L 5/00* | (2006.01) | |
| *H04L 25/02* | (2006.01) | |
| *H04W 72/566* | (2023.01) | |

(52) U.S. Cl.
CPC .......... *H04L 5/0048* (2013.01); *H04L 25/025* (2013.01); *H04L 25/0226* (2013.01); *H04W 72/566* (2023.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2009/0323773 A1* | 12/2009 | Bala .................. H04B 7/0654 375/141 |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0227561 A1* | 9/2010 | Chakraborty ......... H04L 5/0085 455/67.11 |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0008722 A1 | 1/2012 | Serbetli et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0182895 A1* | 7/2012 | Jwa .................... H04L 5/0048 370/252 |

(56) References Cited

U.S. PATENT DOCUMENTS

| | | |
|---|---|---|
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0052951 A1* | 2/2013 | Hwang .................. H04W 72/12 455/41.1 |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2013/0336232 A1 | 12/2013 | Yang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1* | 2/2017 | Rakib .................. H04L 27/2655 |
| 2017/0040711 A1 | 2/2017 | Rakib et al. |
| 2017/0078054 A1 | 3/2017 | Hadani et al. |
| 2017/0099122 A1* | 4/2017 | Hadani .................. H04L 5/0048 |
| 2017/0099607 A1 | 4/2017 | Hadani et al. |
| 2017/0126300 A1* | 5/2017 | Park .................. H04L 5/0048 |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288710 A1* | 10/2017 | Delfeld .................. H04L 5/0048 |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0248675 A1* | 8/2018 | Bhattad .................. H04W 72/0446 |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0075582 A1* | 3/2019 | Kim .................. H04L 1/1607 |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | | |
|---|---|---|---|
| WO | 2014004585 | 1/2014 | |
| WO | 2016014596 | 1/2016 | |
| WO | 2016014598 | 1/2016 | |
| WO | WO-2016106091 A1 * | 6/2016 | ......... H04L 27/0006 |
| WO | 2016176642 | 11/2016 | |
| WO | 2016183230 | 11/2016 | |
| WO | 2016183240 | 11/2016 | |
| WO | 2016209848 | 12/2016 | |
| WO | 2017003952 | 1/2017 | |
| WO | 2017011455 | 1/2017 | |
| WO | 2017011478 | 1/2017 | |
| WO | 2017044501 | 3/2017 | |
| WO | 2017087706 | 5/2017 | |
| WO | 2017100666 | 6/2017 | |
| WO | 2017147439 | 8/2017 | |
| WO | 2017165697 | 9/2017 | |
| WO | 2017173160 | 10/2017 | |
| WO | 2017173389 | 10/2017 | |
| WO | 2017201467 | 11/2017 | |
| WO | 2018031938 | 2/2018 | |
| WO | 2018031952 | 2/2018 | |
| WO | 2018032016 | 2/2018 | |
| WO | 2018064587 | 4/2018 | |
| WO | 2018064605 | 4/2018 | |
| WO | 2018106731 | 6/2018 | |
| WO | 2018129554 | 7/2018 | |
| WO | 2018140837 | 8/2018 | |
| WO | 2018191309 | 10/2018 | |
| WO | 2018195548 | 10/2018 | |
| WO | 2018200567 | 11/2018 | |
| WO | 2018200577 | 11/2018 | |
| WO | 2019014332 | 1/2019 | |
| WO | 2019032142 | 2/2019 | |

(56) References Cited

FOREIGN PATENT DOCUMENTS

| | | |
|---|---|---|
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

CATT, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

Extended European Search Report for co-pending EP Application No. 22189472.8, dated Nov. 24, 2022 8 pages.

* cited by examiner

COMMUNICATION TECHNIQUES USING QUASI-STATIC PROPERTIES OF WIRELESS CHANNELS

CROSS REFERENCE TO RELATED APPLICATIONS

This patent document is a continuation of U.S. patent application Ser. No. 16/606,164, filed 17 Oct. 2019, which is a 371 National Phase Application of PCT Application No. PCT/US2018/028926 entitled "COMMUNICATION TECHNIQUES USING QUASI-STATIC PROPERTIES OF WIRELESS CHANNELS" and filed on 23 Apr. 2018 which claims the benefit of priority of U.S. Provisional Patent Application No. 62/488,663 entitled "TECHNIQUES FOR USING STATIONARY PROPERTIES OF WIRELESS CHANNELS" and filed on 21 Apr. 2017. The entire contents of the before-mentioned patent applications are incorporated by reference as part of the disclosure of this patent document.

This patent document claims the benefit of priority of U.S. Provisional Patent Application No. 62/488,663 entitled "TECHNIQUES FOR USING STATIONARY PROPERTIES OF WIRELESS CHANNELS" and filed on 21 Apr. 2017. The entire content of the before-mentioned patent application is incorporated by reference as part of the disclosure of this patent document.

TECHNICAL FIELD

The present document relates to wireless communication, and more particularly, channel estimation and scheduling in fixed wireless access and related systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which both the transmitter and receiver remain at the same location for long periods of time, such as in fixed wireless access (FWA) systems, or cellular systems in which the user equipment is placed in a location and not moved for some time.

SUMMARY

This document discloses techniques for using quasi-static properties of a wireless channel to improve communication performance.

In one exemplary aspect, a method that is implementable by a wireless device is disclosed. The method includes receiving a set of pilots over a transmission channel between the wireless communication apparatus and a far-end communication apparatus, the transmission channel including a first portion that is time-invariant and a second portion that is time-variant, processing the received set of pilots to generate an estimate of the first portion, processing the received set of pilots to generate an estimate of the second portion, and performing a communication based on a channel state information that is a weighted combination of a first term that is based on the estimate of the first portion and a second term that is based on the estimate of the second portion.

In yet another exemplary aspect, the above-described methods are embodied in the form of processor-executable code and stored in a computer-readable program medium.

In yet another exemplary aspect, a device that is configured or operable to perform the above-described methods is disclosed.

The above and other aspects and their implementations are described in greater detail in the drawings, the descriptions, and the claims.

BRIEF DESCRIPTION OF THE DRAWINGS

Drawings described herein are used to provide a further understanding and constitute a part of this application. Example embodiments and illustrations thereof are used to explain the technology rather than limit its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other. Section numbering is used only for the ease of understanding and do not limit the applicability and combinability of the embodiments and techniques described in each section to that section only. In this document, the terms static and time-invariant are used interchangeably, and similarly the term dynamic and time-variant (or time-varying) are also used interchangeably.

Figure 1:
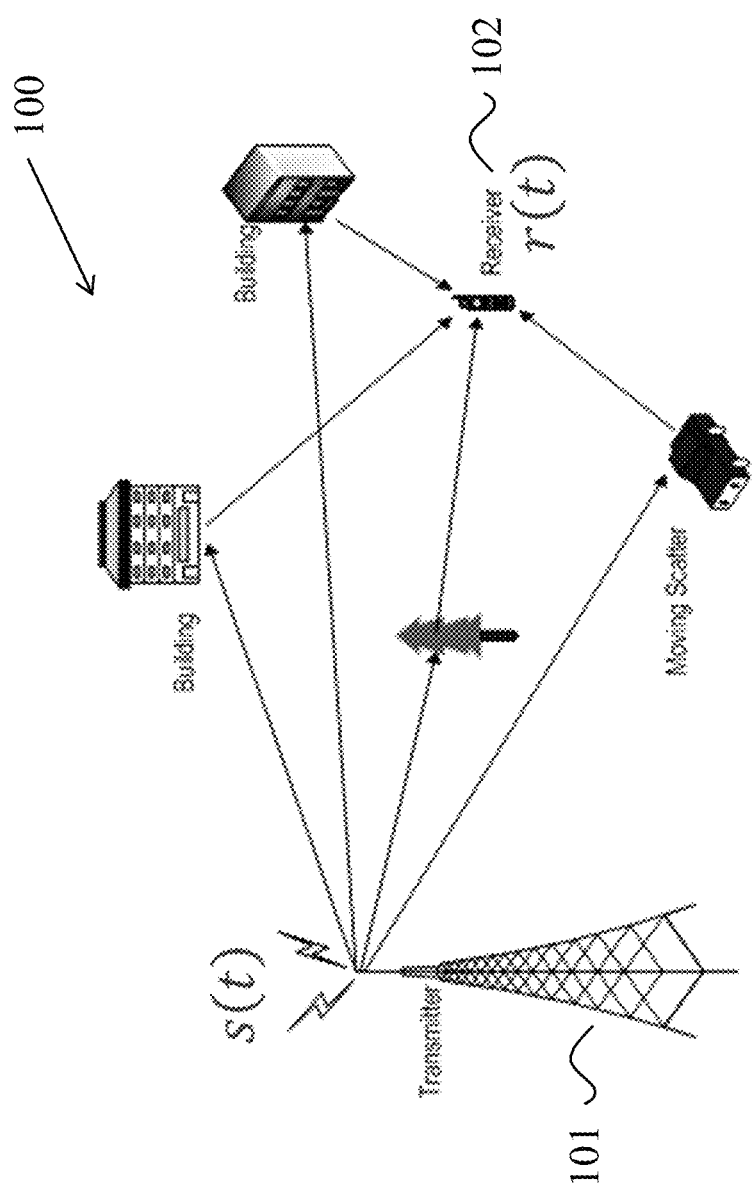
FIG. 1 shows an example communication network.

FIG. 1 shows an example communication network 100 in which the disclosed technologies may be implemented. The network 100 may include a base station transmitter that transmits wireless signals s(t) (downlink signals) to one or more receivers 102, the received signal being denoted as r(t), which may be located in a variety of locations, including inside or outside a building. The receivers may transmit uplink transmissions to the base station, typically located near the wireless transmitter. The technology described herein may be implemented at a receiver 102 or at the transmitter (e.g., a base station).

In the description, the example of a fixed wireless access (FWA) system is used only for illustrative purpose and the disclosed techniques can apply to other wireless networks. For example, a nomadic scenario, in which a UE is placed in a static position for a number of minutes, would be amenable to the methods described here.

Figure 2:
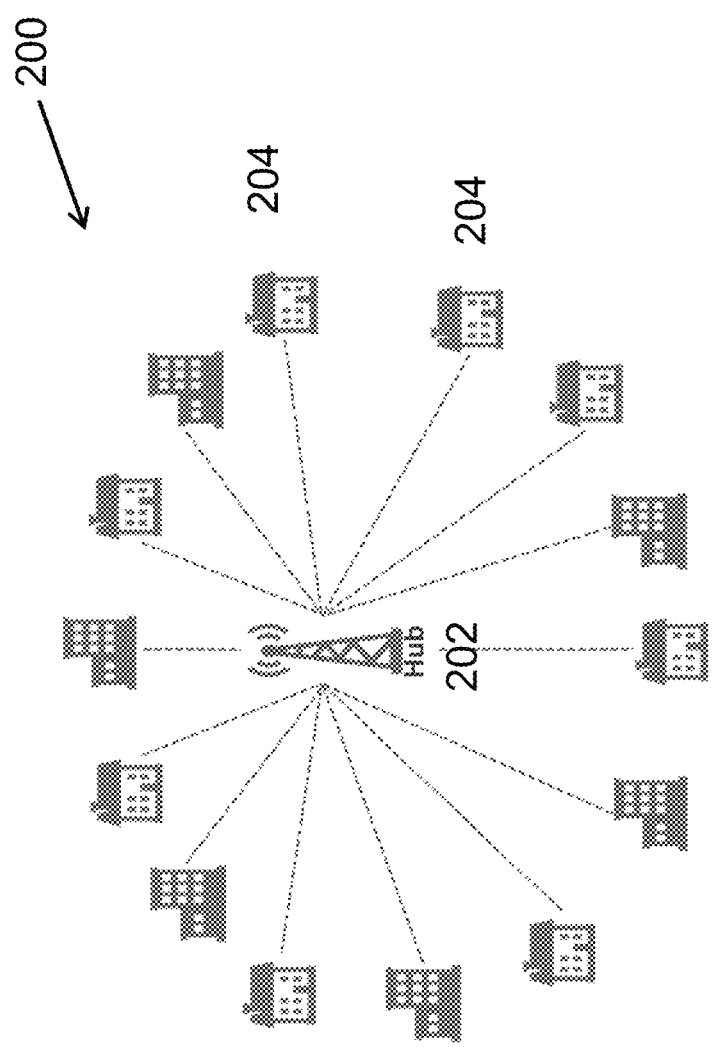
FIG. 2 shows an example of a fixed wireless access network.

FIG. 2 shows an example of a fixed wireless access system 200. A hub 202, that includes a transmission facility such as a cell tower, is configured to send and receive transmissions to/from multiple locations 204. For example, the locations could be user premises or business buildings. As described throughout this document, the disclosed embodiments can achieve very high cell capacity in fixed wireless access, when compared to traditional fixed access technology. Some techniques disclosed herein can be embodied in implementations at the hub 202 or at transceiver apparatus located at the locations 204.

Figure 3:
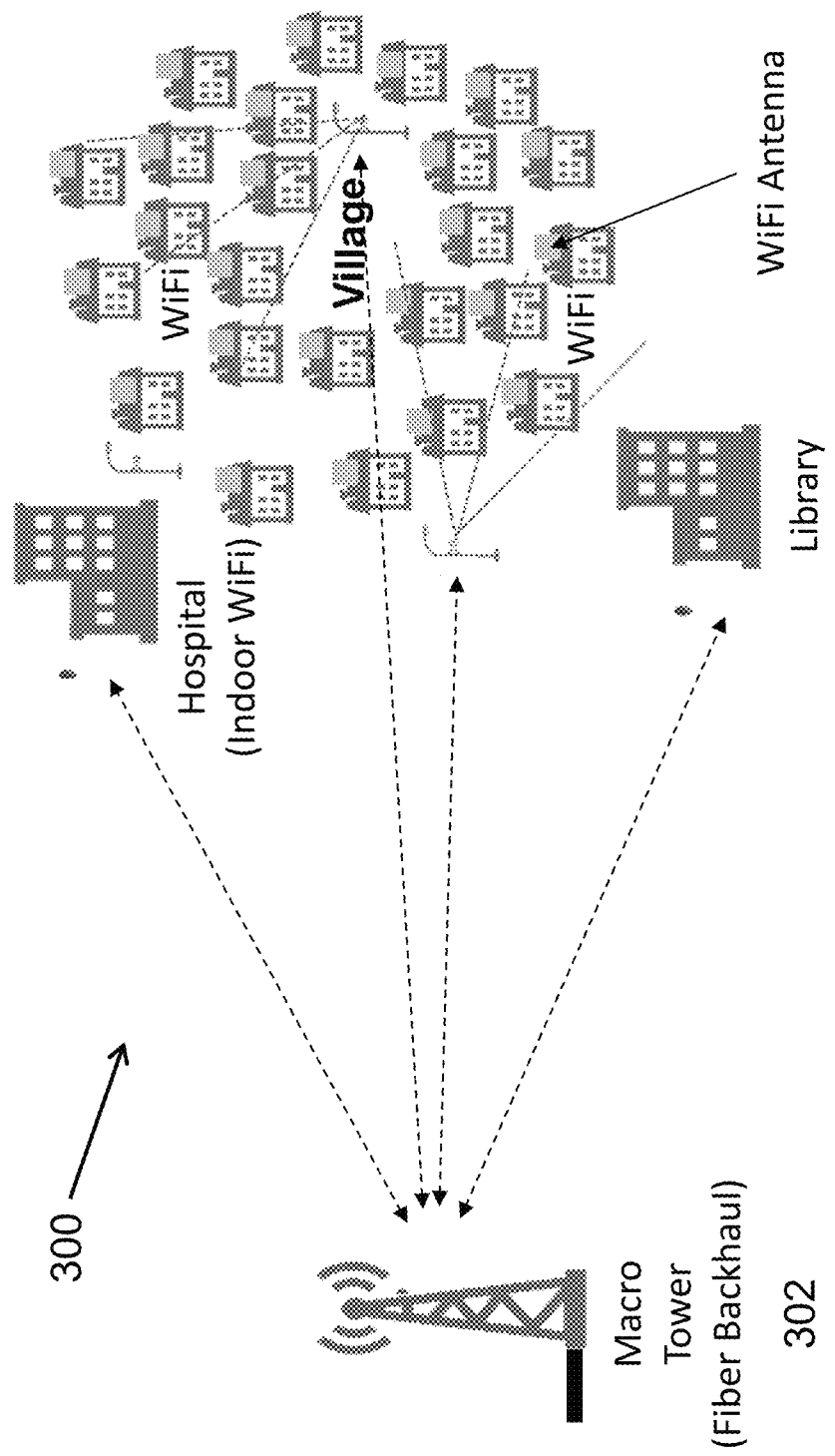
FIG. 3 shows another example of a fixed wireless access network.

FIG. 3 shows yet another configuration of a fixed access wireless communication system 300 in which hops are used to reach users. For example, one cell tower may transmit/receive from another cell tower, which would then relay the transmissions between the principal cell tower and the users, thus extending range of the fixed wireless access system. A backhaul may connect the transmission tower 302 with an aggregation router. For example, in one configuration, a fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. For example, embodiments may be able to reduce the overhead of pilot signals and re-purpose that bandwidth to data transmission. Some techniques disclosed herein can be embodied in implementations at the macro tower 302 or at transceiver apparatus located at the other locations.

The techniques disclosed in the present document provide solutions for using quasi-static properties of a wireless channel to improve communication performance in a fixed wireless access system. Section headings are used in the present document to improve readability of the description and do not in any way limit the discussion to the respective sections only.

1. Example Characterization of the FWA Channel

There is a wide interest in FWA systems, as they promise to deliver fast internet connectivity without the need for the expensive laying of cables to the customer premises. Many of the systems currently under development (or ready for deployment) are based on cellular standards such as the LTE (Long Term Evolution) standard of 3GPP. However, use of such standardized products for FWA is inefficient because those systems are designed to cope with user mobility. This document discloses various methods, which can be used individually, or in conjunction, on how to exploit the special properties of FWA propagation channels in order to improve system performance.

Some of the disclosed embodiments use a property that an FWA channel consists of the sum of a time-invariant part, superposed with a weaker time-variant component; the schemes thus typically do not have equivalents for mobile wireless systems where the entire channel typically changes with time.

An FWA channel consists of components that are temporally invariant, such as (possibly) a line of sight (LOS) component, reflections on buildings, diffraction over rooftops, etc. Note that these time-invariant components exist even in the case of a non-LOS scenario, i.e., where the direct optical LOS is blocked. In addition to these time-invariant components, there are also time-varying components, which mostly arise from three factors—(1) moving cars/trucks, (2) moving people, and (3) moving leaves.

In this document, the ratio of the total sum power of the time-invariant components to that in the time-variant components is called the temporal Rice factor. To make this more precise, define the set $S^s$ and $S^d$ as the sets of multi-path components (MPCs) being time-invariant and time-variant, respectively. Then the temporal Rice factor (denoted $K_t$) is defined as $$K_t = \Sigma_{i \in S^s} P_i / \Sigma_{i \in S^d} P_i. \tag{1}$$

This temporal Rice factor may be compared to the definition of the "standard" (mobile) Rice factor, which is usually assumed to be nonzero only when either a LOS or (for NLOS) a dominant reflected MPC exists. The standard Rice factor (denoted $K_r$) is defined as $$K_r = P_{LOS} / \Sigma_{i \notin LOS} P_i. \tag{2}$$

Thus, a high temporal Rice factor (e.g., 20 dB) is common in fixed wireless systems even in NLOS situations. In contrast, in mobile systems, the temporal Rice factor cannot be meaningfully defined; the "standard" Rice factor typically is on the order of 10-20 dB in LOS situations, and is near 0 in NLOS. A further interesting difference, the LOS component in a mobile system actually shows phase variations as a function of time, though the amplitude stays constant.

As discussed, an FWA channel is fundamentally different from a mobile channel with a slow-speed UE. While both channels have small root mean-squared (rms) Doppler spreads, an FWA channel has a time-invariant component around which there are (possibly quite fast) small variations. By contrast, a mobile channel with a slow UE may change completely over a large enough timescale. It is this difference that allows some of the disclosed embodiments to create more efficient channel estimation and extrapolation schemes.

In some embodiments, an additional property of FWA channels is that the time-variant components dominantly occur at small excess delays, which may be due to the fact that relevant time-varying scatterers (in particular, cars and moving people) are usually close to the UE (whereas signals from cars "around the street corner" suffer strong attenuation, and are thus not relevant). Multi-path channels (MPCs) going via these scatterers, and from there via the dominant propagation paths, have a small excess delay relative to those dominant paths.

For example, a path defined as: UE to nearby moving scatterer to far scatterer to BS, would typically have low power. Long-delayed components have a somewhat weaker power than short-delayed ones, since they suffer larger distance-dependent pathloss, and also might have to traverse more obstacles on the way form TX to RX. Thus, even if the relative power ratio between time-invariant and time-variant contributions of the long-delayed MPCs is the same, the absolute contribution of time-variant MPCs with long delays is small. This is compounded for the situation that the time variations are coming from moving cars. In that case, time-variant MPCs with large delay would take the path UE (with downward direction)—car (upward)—far scatterer (upward)—BS. From the usual laws of reflection angles and typical heights of UEs and BSs in FWA systems, it can be easily seen that nearby cars do not play a role, since reflections off them would go "over the head" of the far scatterer; while far-away cars carry little power.

To a first approximation, the support of the delay-Doppler impulse response can be expressed as the sum of two rectangles: one extending from $[0, \kappa_\tau^d; -\kappa_v^d/2, \kappa_v^d/2]$ (where the first coordinate is delay and the second coordinate is Doppler) and a second one extending along the delay axis, with the extent along the y-axis either infinitesimal (e.g., a delta function at v=0, or extending $[-K_T^S/2, K_T^S/2]$. This document provides interpretations of this latter definition as reflecting hardware non-idealities. Let $K_T^{pne}$ be defined as some constant $K_T^{pne} < K_T^s - K_T^d$; it can be interpreted as the part of the static impulse response that will be used for estimation of phase noise etc.

In some embodiments, when pilot tones are scheduled such that the corresponding received signals overlap, as described above, then it may be necessary to from time to time also transmit pilots that do not have such an overlap. This advantageously enables the time-invariant part to be extracted. The frequency of these additional pilots may be much lower than those required to estimate the time-variant part.

The considerations about the relationship between temporal Rice factor and delay are qualitative, and future channel measurements may be used to further and more accurately characterize this aspect of the channel. The various methods described in this document may in general work in situations regardless of whether the above-described relationships between the delay and Doppler domain properties are fulfilled or not.

2. Example Embodiments for Channel Estimation

In some embodiments, channel estimation and interpolation may be useful for both uplink and downlink channels in an FWA system. Furthermore, channel extrapolation may be used for the determination of the appropriate modulation and coding set and other transmission parameters in uplink and downlink, as well as for multi-user downlink beamforming. Assuming channel reciprocity, the channel information can be obtained from uplink pilots. However, this assumption relies on a large number of pilots needing to be transmitted continuously by the UEs. The spectral resources that have to be dedicated to the uplink (reciprocity) pilot transmission can take significant bandwidth away from data transmissions.

Channel estimation/extrapolation. In order to enable transmission in the downlink with the maximum capacity, the BS has to be able to extrapolate the propagation channel to the time at which the data are actually being transmitted in the downlink. This may require that the extrapolation extend at least for the duration for the downlink frame (e.g., 1 ms). In some embodiments, the performance that may be achieved when the second-order fading statistics (temporal autocorrelation, or equivalently, Doppler power spectrum) are known is discussed, and such extrapolation may use knowledge of the past channel evolution.

Pilot packing. Due to the need for knowledge of the past channel, the UEs in many present day systems continuously transmit pilots to the BS, so that the BS has knowledge of the channel evolution whenever it needs to send packets in the downlink. While there may be alternatives to this continuous transmission (e.g., forfeit improved channel quality at least for the first of a series of packets for a user, or have all transmissions to emulate non-causality), embodiments of the disclosed technology may be used to in implementations in which full and instantaneous knowledge of all the uplink channel histories is provided.

These issues are similar to what is expected in 5G, but 5G-centric solutions do not provide optimal (or even near optimal) solutions for the FWA system. This is due to a difference between 5G and FWA; the former has to be able to deal with mobile channels, whereas the latter deals with fixed wireless access channels. The properties of the FWA channels may be exploited for improving the channel estimation, as well as obtaining better pilot packing.

2.1 Example Embodiments for Channel Estimation in Mobile Systems

Standard channel estimation methods in mobile channels for OFDM (estimation in the frequency domain) typically include transmitting pilot symbols on a set of subcarriers. In the simplest case (which is used, e.g. in Wi-Fi), a pilot symbol is transmitted on every subcarrier using a dedicated training symbol. An exemplary embodiment may interpret the ratio of the (complex) received signal $Y_n$ to the complex transmit pilot symbol $X_n$ as the transfer function on this subcarrier, and the least-squares channel estimate is given as:

$$H_n^{LS} = Y_n/X_n. \qquad (3)$$

However, this method discards the frequency correlation between the subcarriers. A more accurate estimate is obtained from incorporating the correlation function to provide a linear minimum mean square error (LMMSE) estimate, which is defined as:

$$H^{LMMSE} = R_{HH^{LS}} R_{H^{LS} H^{LS}}^{-1} H^{LS} \qquad (4)$$

where $$R_{HH^{LS}} = R_{HH} \qquad (5a)$$

$$R_{H^{LS}H^{LS}} = R_{HH} + \sigma^2 I R_{HH} = \mathbb{E}\{H^* H^T\} \qquad (5b)$$

This LMMSE formulation exploits the correlation of the channels between the subcarriers, and thus reduces the sensitivity to noise. An alternative formulation may be based on a sparse channel model, where the assumption is that only a few resolvable MPCs exist.

With respect to the temporal correlation in such embodiments, for channel estimation at a particular point in time, the mathematical formulation is equivalent to the above description, with temporal samples taking on the role of subcarriers. Here the formulation of the MMSE takes the actual shape of the correlation function into account, not just the support as discussed in the mathematical derivation in the next section (see the MMSE sequence-based interpolation subsection). While the change in notation is minor, taking into account the shape of the correlation function may be advantageous in certain scenarios.

2.2 Example Embodiments for Channel Estimation in FWA Systems

The FWA channel may be interpreted in two manners:
(1) As a non-zero-mean random process, wherein the extrapolator (interpolator) is a filter, and its parameters are derived from the support and/or correlation function of the observed channels; and
(2) as a deterministic constant plus a zero-mean random process.

In an environment where both the deterministic and random parts have time-invariant statistics, there would be no difference between the two interpretations. However, if the average power or other statistical properties of the time-variant part are themselves changing with time, the two approaches are different: in the first interpretation, the mean and covariance matrix have to be estimated jointly. If the region over which the statistics are constant is short, then there may be a significant estimation error on both contributions, which may lead to a channel SNR (including the estimation error) that is worse than the temporal Rice factor.

In the second interpretation, embodiments may use essentially infinite time to estimate the time-invariant part. As mentioned above, some embodiments do not equate the long-term mean with the time-invariant part, but rather perform a Doppler filtering and use only the $v=0$ component for the time-invariant part. Thus, even when the time-variant part is non-zero-mean, such embodiments get the correct estimation of the time-invariant part. Furthermore, since such implementations have a much longer duration over which to estimate the time-invariant part, the error of this estimate will approach zero. Thus, the extrapolated channel cannot have a channel SNR that is worse than the temporal Rice factor.

A possible drawback of the second interpretation, and use of the long-term Doppler filtering, is the greater sensitivity to phase noise errors. In other words, implementations should track, and compensate, phase noise over a long period of time.

In either case, the estimation of the correct second-order statistics in an environment in which those statistics may change with time may be challenging. Such time-varying statistics may arise in particular if the time-varying MPCs are associated with scattering by cars or people (who might "pass by" the UE, and then vanish); time-varying components due to leaves moving in the wind are expected to show larger stationarity times (e.g., times during which the statistics remain essentially constant), though this depends heavily on wind conditions. Any suitable method for estimating second-order statistics in time-variant environments might be used for this purpose.

In some embodiments, the channel estimator estimates the time-invariant part as described above, estimates and interpolates/extrapolates the time-variant part based on any of the methods described above, and combines those two parts to obtain the overall instantaneous channel estimate for the timepoint of interest.

MMSE sequence-based interpolation. Given the two superposed parts of the FWA channel (time-varying and time-invariant components), a channel estimate may be derived to leverage this channel structure. Herein, a mathematical framework for MMSE channel interpolation based on delay Doppler statistical priors and general sequence-based pilot design is discussed. In particular, two cases are considered: (1) the delay-Doppler characteristics of the channel are defined as a rectangular region in the delay-Doppler plane of specific delay and Doppler spreads, and (2) the channel is defined as a sum of two independent random variables—one modeling the static (time-invariant) component and the other the dynamic (time-variant) component.

First consider a framework in which $\Lambda$ is a lattice, and wherein a typical example is a two-dimensional time-frequency lattice defined as:

$$\Lambda = \mathbb{Z} \Delta t \oplus \mathbb{Z} \Delta f. \tag{A.1}$$

Figure 4:
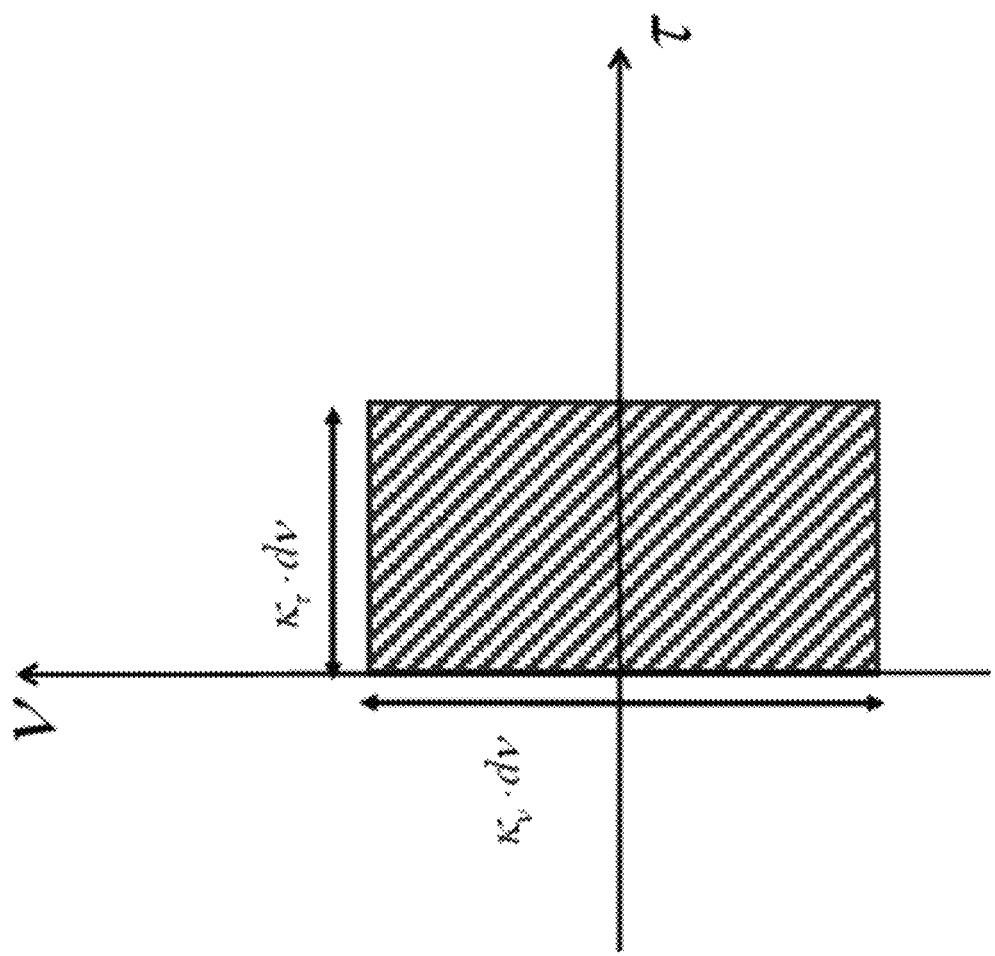
FIG. 4 is a graph showing an example of the delay Doppler region defining the second order statistics of the wireless channel.

For every $i=1, \ldots, L$ (L is the number of pilots), define a function $r_i: \Lambda \to \mathbb{R}$ that describes the covariance matrix of the i-th channel. In general, $r_i$ is factorized as a multiplication of sinc functions:

$$r_i(n\Delta t, m\Delta f) = \exp(j\pi\kappa_{\tau,i} m) \cdot \text{sinc}(\kappa_{\tau,i} m) \cdot \text{sinc}(\kappa_{v,i} n), \tag{A.2}$$

where $\kappa_{\tau,i}, \kappa_{v,i} \in [0,1)$ define the delay-Doppler spread of the i-th channel. As shown in FIG. 4, there is an exponential shift along the frequency reflecting the causality of the channel. Let $S' \subseteq S \subset \Lambda$ be a nested pair of subsets of the lattice. The set S consists of all the points that need to be evaluated for interpolation and the set S' consists of the points of measurement. In an example, S may be a physical resource block (PRB) square region and S' may be the subset that include pilot positions.

A restriction mapping 7C, which takes an S sequence and selects coordinates which belong to the subset S', is defined as:

$$\pi : \mathbb{C}(S) \to \mathbb{C}(S'). \tag{A.3}$$

Additionally, for every index $i=1, \ldots, L$, consider a sequence $\psi_i: S' \to \mathbb{C}$ that serves as a pilot sequence for the i-th channel. The sequence $\psi_i$ may be designed according to different techniques. In an example, the sequence may be an Orthogonal Time Frequency Space (OTFS) sequence, a Gaussian OTFS (GOTFS) sequence, and so on.

In some embodiments, the interpolation problem may be cast as an MMSE estimation problem. For every index $i=1, \ldots, L$, the i-th channel may be modeled by a random variable $X_i \in \mathbb{C}(S)$ with covariance matrix $R_{X_i}$, defined as:

$$R_{X_i}(\lambda_1, \lambda_2) = r_i(\lambda_1 - \lambda_2). \tag{A.4}$$

Note that the notation used herein indexes the coordinates of the matrix by pairs of elements of the lattice. This is the canonical indexing albeit an arbitrary indexing is introduced by enumerating the points on the subset S by numbers $1, \ldots, N=\#S$. The forward MMSE "channel" equation described the measurement process is given by:

$$Y = \sum_{i=1}^{L} \psi_i \cdot \pi(X_i) + W, \tag{A.5}$$

where W is white Gaussian noise $W \sim \mathcal{N}(0, N_0)$ such that $W \perp X_i$, $i=1, \ldots, L$. The SNR of the i-th channel is defined to be:

$$SNR_i = r_i(0)/N_0. \tag{A.6}$$

The MMSE interpolator of the i-th channel $X_i$ is given by $\hat{X}_i = C_i(Y)$, where:

$$C_i = R_{X_i, Y} R_Y^{-1}, \tag{A.7}$$

and where the matrix $R_Y$ is given by:

$$R_Y(\lambda_1', \lambda_2') = \sum_{i=1}^{L} \psi_i(\lambda_1') r_i(\lambda_1' - \lambda_2') \overline{\psi_i(\lambda_2')} + R_W, \tag{A.8}$$

for every pair of indices $\lambda_1', \lambda_2' \in S'$. The matrix $R_{X_i, Y}$ is given by:

$$R_{X_i, Y}(\lambda, \lambda') = r_i(\lambda - \lambda') \overline{\psi_i(\lambda')}, \tag{A.9}$$

for every pair of indices $\lambda \in S$ and $\lambda' \in S'$.

The framework for the interpolation problem described above is now interpreted in the context of fixed wireless access (FWA). It is assumed that the transmitter and receiver are fixed, so that the only source of Doppler comes from moving transient reflectors. The corresponding model splits the channel into two components: one is time-invariant from the static reflectors (called the static component) and the other is due to moving reflectors (called the dynamic component). The i-th channel variable $X_i$ may be expressed as a sum of two independent random variables:

$$X_i = X_i^s + \epsilon X_i^d, \tag{B.1}$$

where the two independent random variables are defined as:

$$X_i^s \sim \mathcal{N}(\overline{X}_i^s, R_{X_i^s}),$$ (B.2)

$$X_i^d \sim \mathcal{N}(0, R_{X_i^d}),$$ (B.3)

with the corresponding covariance matrices expressed as:

$$R_{X_i^s}(\lambda_1, \lambda_2) = r_i^s(\lambda_1 - \lambda_2), \text{ and}$$ (B.4)

$$R_{X_i^d}(\lambda_1, \lambda_2) = r_i^d(\lambda_1 - \lambda_2).$$ (B.5)

As seen above, the variable $X_i^s$ corresponds to the static component and is modeled as a Gaussian random variable with a non-zero mean. The variable $X_i^d$ is called the dynamic component and is modeled as a Gaussian random variable with zero mean. In steady-state, the static component becomes a "deterministic" variable, $$X_i^s = \overline{X}_i^s, \text{ and } R_{X_i^s} = 0.$$

The proportionality constant $\epsilon \in \mathbb{R}^{\geq 0}$ is referred to as the temporal Rice factor. The following definitions are assumed for the functions $r_i^s$ and $r_i^d$:

$$r_i^a(n\Delta t, m\Delta f) = \exp(j\pi\kappa_{\tau,i}^s m) \cdot \text{sinc}(\kappa_{\tau,i}^s m)$$ (B.6)

$$r_i^d(n\Delta t, m\Delta f) = \text{sinc}(\kappa_{\tau,i}^d n) \cdot \exp(j\pi\kappa_{\tau,i}^d m) \cdot \text{sinc}(\kappa_{\tau,i}^d m)$$ (B.7)

The above definitions state that the static component is causal and time-invariant and the dynamic component is causal with a small delay spread and non-zero symmetric Doppler spread. The exponential shift along frequency in Equations (B.6) and (B.7) reflect the causality of the channels. Finally, the following relation is assumed between the delay spreads of the static and dynamic components:

$$\kappa_{\tau,i}^d \ll \kappa_{\tau,i}^s.$$ (B.8)

Figure 5:
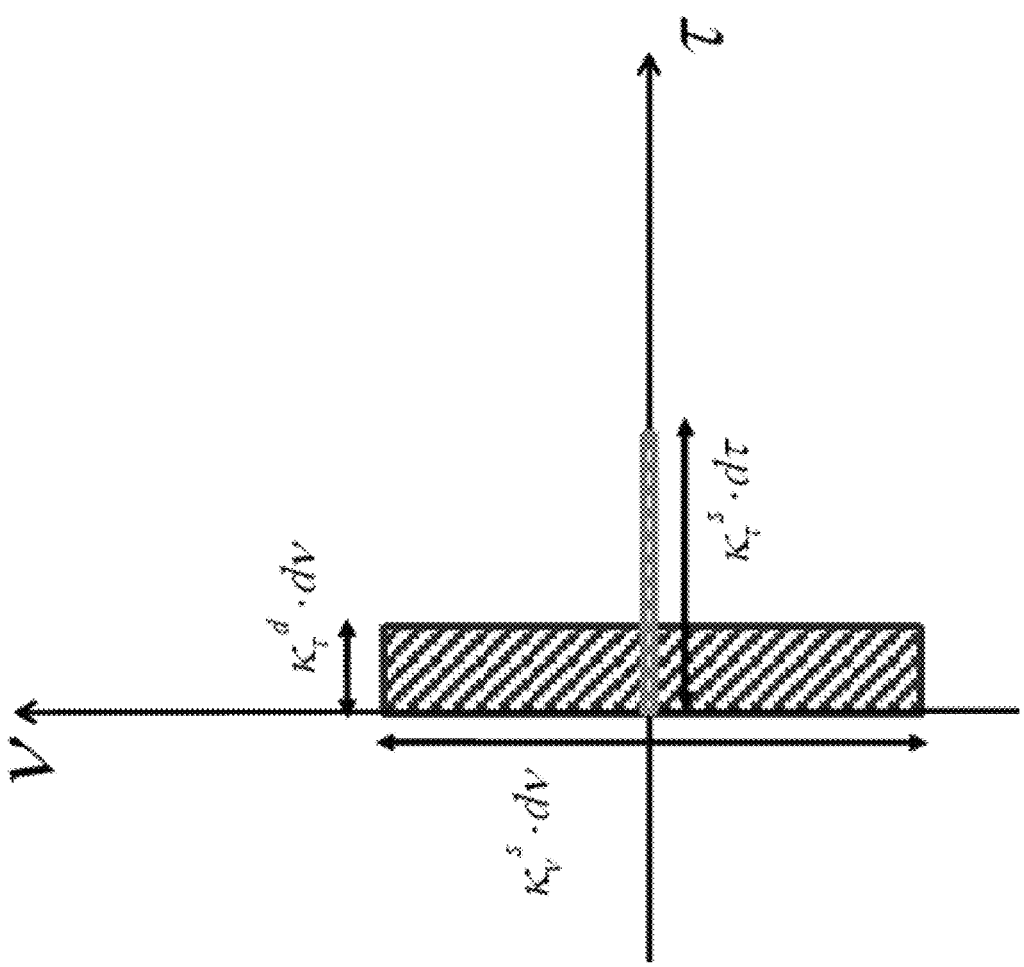
FIG. 5 is a graph showing an example of the static and dynamic components of a wireless channel in the delay Doppler region.

In other words, the delay spread of the dynamic component is significantly smaller than the one of the static component, as shown in FIG. 5. The physical reasoning behind this condition is that the dominant moving reflectors are the ones that are close either to the transmitter or the receiver, as discussed in the "Example Characterization of the FWA Channel" section.

The MMSE equation relating the input channel variables $X_i \in \mathbb{C}(S)$, $i=1, \ldots, L$ with the measured output variable $Y \in \mathbb{C}(S')$ is given by:

$$Y = \sum_{i=1}^{L} \psi_i \pi(X_i) + W$$ (B.9)

$$= \sum_{i=1}^{L} \psi_i \pi(X_i^s) + \epsilon \sum_{i=1}^{L} \psi_i \pi(X_i^d) + W,$$

where W is white Gaussian noise distributed as $W \sim \mathcal{N}(0, N_0)$ such that $W \perp X_i$, $i=1, \ldots, L$, and $\psi_i \in \mathbb{C}(S')$ is the pilot sequence of the i-th channel. In some embodiments, it is assumed that $\psi_i$ is an OTFS sequence given by a symplectic exponential with parameters $(\tau_i, v_i)$, and defined as:

$$\psi_i(n\Delta t, m\Delta f) = \exp(-j2\pi(v_i n\Delta t - \tau_i m\Delta f)).$$

For every $i=1, \ldots, L$, the MMSE interpolators (estimators) of the static and dynamic components $X_i^s$ and $X_i^d$, respectively, take the following form:

$$\hat{X}_i^s = C_i^s(Y - \Sigma_{j=1}^{L} \psi_j \pi(\overline{X}_j^s)) + \overline{X}_i^s,$$ (B.10)

$$\hat{X}_i^d = C_i^d(Y - \Sigma_{j=1}^{L} \psi_j \pi(\overline{X}_j^d)),$$ (B.11)

where the MMSE interpolation filters are given by:

$$C_i^s = R_{X_i^s, Y} \cdot R_Y^{-1}, \text{ and}$$ (B.12)

$$C_i^d = R_{X_i^d, Y} \cdot R_Y^{-1}.$$ (B.13)

Finally, the covariance matrix of Y is given by:

$$R_Y(\lambda_1', \lambda_2') = \sum_{i=1}^{L} \psi_i(\lambda_1') r_i(\lambda_1' - \lambda_2') \overline{\psi_i(\lambda_2')} + R_W$$ (B.14)

$$= \sum_{i=1}^{L} \psi_i(\lambda_1') r_i^s(\lambda_1' - \lambda_2') \overline{\psi_i(\lambda_2')} +$$

$$\epsilon^2 \sum_{i=1}^{L} \psi_i(\lambda_1') r_i^d(\lambda_1' - \lambda_2') \overline{\psi_i(\lambda_2')} + R_W$$

for every pair of indices $\lambda_1', \lambda_2' \in S'$. The static and dynamic cross-correlation matrices $R_{X_i^s, Y}$ and $R_{X_i^d, Y}$ respectively, are given by:

$$R_{X_i^s, Y}(\lambda, \lambda') = r_i^s(\lambda - \lambda') \overline{\psi_i(\lambda')}, \text{ and}$$ (B.15)

$$R_{X_i^d, Y}(\lambda, \lambda') = \epsilon \cdot r_i^d(\lambda - \lambda') \overline{\psi_i(\lambda')},$$

for every pair of indices $\lambda \in S$ and $\lambda' \in S'$.

3. Example Embodiments for Pilot Overhead Reduction

Some embodiments of the disclosed technology exploit the observation that certain wireless channels may include two components—a relatively dominant non-time varying component and a time-varying component—and can be used to reduce the transmission overhead occupied by pilot signals.

In some embodiments, pilot signals are transmitted by multiple UEs such that channel ringing (e.g., the complete channel impulse response) caused by each user is observed and measured one UE at a time. However, if it is known that long delayed components are present in the wireless system, which typically are time-invariant due to signal reflections from static objects such as high rises, then pilots from different UEs could be superimposed. In practical implementations, receivers tend to have phase noise, and therefore the phase noise may have to be accounted for by implementations. Furthermore, using delay-Doppler domain placement of pilot signals, additional compactness in the pilot placement can be achieved, as further described in the present document.

Pilot Packing with Perfect Transceivers.

In some embodiments, a pilot packing scheme may be designed for the case that the transceivers at UEs and BS are nearly perfect, e.g., do not suffer from either significant phase noise or sampling jitter. In general, the time-invariant part of the channel can be estimated precisely, since very long observations are available. As noted, the time-invariant part is not necessarily the mean of the observations, but rather the result of a Doppler filtering that retains only the v=0 components. Thus, for certain scenarios, it may be assumed that the deterministic part is perfectly known, and may be subtracted from the received signal.

For example, the channel estimation procedure may include estimating the dynamic channel (e.g. the residual) based on the standard estimation problem as discussed, where the support of the delay-Doppler spectrum is now reduced, and contained in the rectangle $[0, k_\tau^d; -k_v^d/2, k_v^d/2]$. Since the support is now limited to a smaller rectangle in the delay-Doppler domain, the pilots may be packed in that domain without reduction in estimation quality. In other words, the number of pilots that may be packed is:

$$N=1/\kappa_\tau^d \kappa_\nu^d. \quad (6)$$

Furthermore, the limited angular support of the dynamic component is advantageous in other ways. Under normal circumstances, pilots can be reused only between those UEs whose angular spectra at the BS do not overlap at all (or, in alternative implementation methods, have a sufficient separation between the occupied signal subspaces). This can be a particular challenge when dominant far scatterers, such as high-rise buildings, are present, which serve as reflectors for many (often widely spaced) UEs. With the "static component subtraction" approach, the requirement for spatial reuse is drastically relaxed: UEs for which the time-variant part of the angular spectrum overlaps have orthogonal pilots (or, in the alternative methods, pilots with sufficiently low correlation coefficients). From physical considerations, this will greatly improve spatial pilot reuse.

Pilot packing with phase noise. Additional complexity may when phase noise is present in the UEs and/or BS. The subtraction of the static components above relies on elimination of the static components in digital baseband. In the presence of phase noise, the subtraction of the static component may occur with the wrong phase, so that a strong residual signal (leading to inter-user pilot contamination) could be present. Due to the large power in the static component, this pilot contamination could dominate the estimation of the time-variant components and render it less effective. A 5° phase shift of the local oscillator implies that the static component is suppressed only by about 20 dB, instead of perfectly. Since the static component is itself typically 20 dB stronger than the dynamic component, this implies that in this case, the estimation SIR of the dynamic component is 0 dB.

It is thus beneficial to correctly estimate the relative phase of the TX and RX oscillators. This can be achieved by using a part of the static part of the impulse response (e.g., the part in the range $[k_T^d, k_T^S]$ for estimation of the channel phase. In other words, since implementations typically know exactly what the impulse response in this part should be, implementations can use the received signal to estimate the phase noise (the phase shift due to phase noise is assumed to be constant for the duration of an impulse response, which is a reasonable assumption). The estimation of the phase shift can be obtained through a simple correlation operation. This approach will reduce the density of the pilot packing.

In some embodiments, if an implementation uses the interval $[k_T^d, k_T^d + k_T^{pne}]$, for estimation of the LO phase (where $k_T^{pne}$ is the duration of the time-invariant part used for channel estimation), then the number of pilots that can be packed reduces to:

$$N=1/\kappa_\nu^d(\kappa_\tau^d + \kappa_\tau^{pne}). \quad (7)$$

Thus, a longer channel estimation period $k_T^{pne}$ means, for the same number of pilots, more spectral resources have to be dedicated to pilots, which may reduce the overall throughput.

On the other hand, a longer observation of the time-invariant impulse response allows noise averaging, e.g., reduction of the impact of non-ideal estimation of the phase rotation due to the thermal noise (or other random effects that are not phase noise). The better the estimation of the phase noise, the better the subtraction of the static component, and thus the effective SNR and extrapolation of the channel. This in turn allows the BS to reduce any safety margin in the downlink and transmit more closely to the actual capacity value.

The choice of $k_T^{pne}$ thus an optimization problem, where the solution depends on operational parameters such as the temporal Rice factor, shape of the power delay profile, SNR or SINR for the downlink, and number of the required pilots. While it might be possible to write down the optimization problem in closed form, it might be more efficient to numerically optimize, especially since this would allow to include other effects such as residual time variations in the "static" part, etc.

The above discussion assumes that the phase deviation of the LOS stays constant for the time interval $[0, k_T^S]$. Since this interval is typically <5 µs, this is a reasonable assumption for all but the worst LOs.

Pilot packing with phase noise and timing jitter. A broadening of the measured Doppler spectrum even in the static part might occur due to phase noise (see above), or possibly errors in the sampling time. Irrespective of the source, in this subsection it is assumed that the broadening cannot be corrected, so that for the delay interval $k_T^d$, $k_\nu^s$ the Doppler spectrum has a support $[-K_\nu^s/2, K_\nu^s/2]$. In this case we do not allow pilot packing along the τ axis, but rather have each pilot offset along the τ axis by $K_T^d$ and along the ν axis by $k_\nu^s$. This will create residual deterministic interference of two kinds: from the static part to the dynamic part, and conversely from the dynamic to the static part. The amount of interference will be subject to the shape of the Doppler spectrum, as well as the source of the spectral broadening of the deterministic component.

Figure 6:
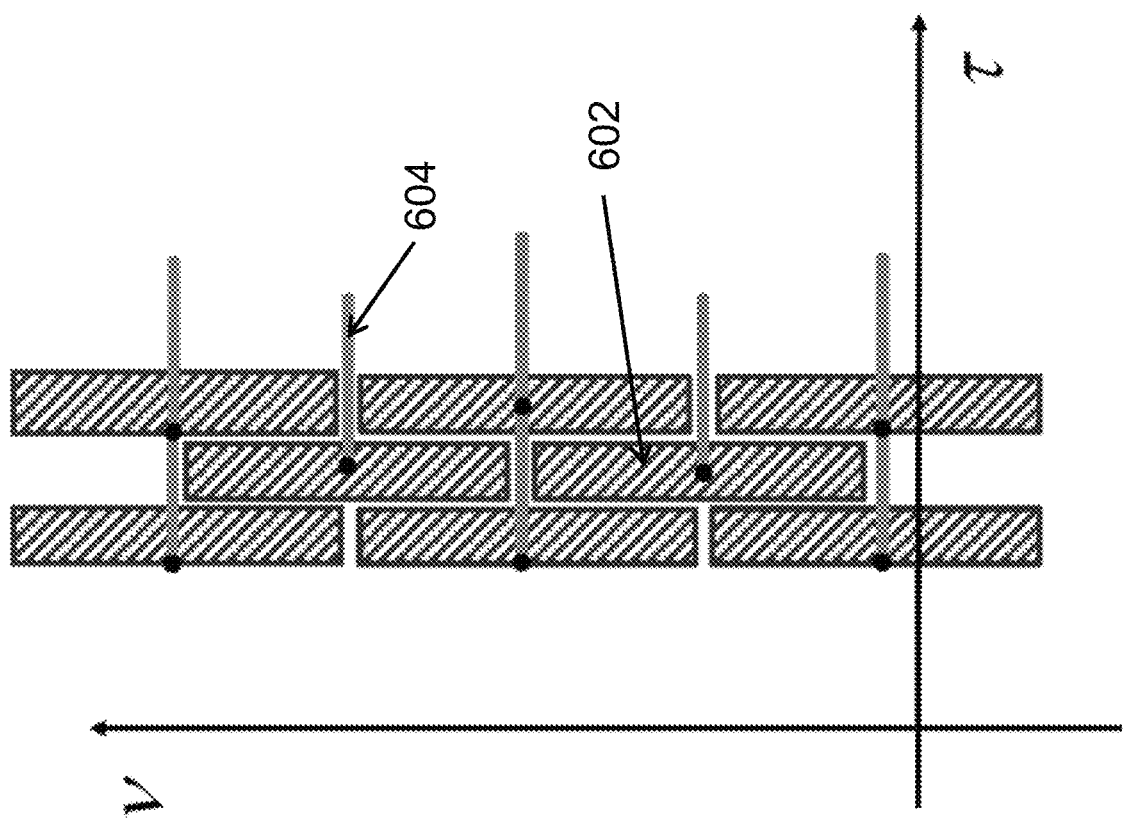
FIG. 6 is a graph showing an example of resource allocation to pilot signals in the delay Doppler region.

FIG. 6 shows an example graph in the delay-Doppler plane showing how pilots can be packed. The width of the hatched rectangle 602 represents delay spread of the dynamic component, which is typically much less than the delay spread 604 of the static component. One reason for this is that the dominant moving reflectors are typically closer to the transmitter or the receiver. Also, the static component is assumed to be due to longer signal paths such as signals bouncing off multi-storied buildings. The height of the rectangle 602 corresponds to the Doppler spread. As seen in FIG. 6, different pilot signals (602+604) may be arranged closer to each other by treating them as interlocking "T" shaped signals in the delay-Doppler domain.

4. Example Alternative Embodiments for Pilot Overhead Reduction

In some embodiments, an FWA channel may include some users that are almost completely static (e.g., temporal Rice factor above 30 dB), while others show a lower temporal Rice factor. For the former category, transmission of pilot tones is possibly redundant as soon as the time-invariant part is known. The only thing that might change is the phase of the received signal—not because of changes in the channel, but because of phase noise. However, this does not typically affect the precoder, and can be incorporated purely by the demodulation pilot.

In some embodiments, there may be a broadcast pilot in the downlink, which the user devices may monitor. If any changes in the channel occur, the user devices may send pilots in the uplink direction; otherwise they may refrain from sending pilots.

In some embodiments, it may also be possible to classify (and move) user devices between the "small Rice factor" to the "large Rice factor" categories on a long-term basis, based on observations of the channel. For example, in many places moving cars might be relevant during rush hour, but not in the evening hours. Adaptive (learning) strategies can be determined to identify these aspects. In other places (e.g., near highways), there could be a continuous Doppler component.

For example, after a UE is first placed in its location, it may initially be classified assuming that the Rice factor is low (default mode); it can then be migrated to the "high Rice factor" category based on measurements of the channel state over long times.

In some embodiments, different users can have different maximum excess delays, and therefore gains in spectral efficiency can be made by assigning to each user device only the delay span that corresponds to its pilots.

5. Example Embodiments for Scheduling in FWA Systems

5.1 Introduction

One of the challenges in any wireless system is the scheduling of users. Second-generation cellular systems like GSM, which only (or mainly) carried voice traffic, used the simple round-robin scheme, in which every user is assigned a periodic set of timeslots, e.g., there is a fixed interval between the times at which a user signal is transmitted. For such systems, performance, when averaged over time, is the same no matter which set of timeslots is assigned. The rise of third-generation and in particular fourth-generation systems like LTE, which put emphasis on data transmission, which is typically operated with larger latency permitted than in voice, and which allow a "tiling" of the time-frequency plane through the use of OFDMA, motivated the use of "opportunistic scheduling". In such a scheme, users are assigned to frequency bands (subcarriers) and timeslots in which their channel has high transmission quality.

For example, a user may not be assigned a subcarrier that is in a deep fading dip for this user; instead the subcarrier will be given to a user that has a better SNR for this subcarrier (note that each user experiences different channels to the BS). The user scheduling needs to be optimized according to some criterion. For example, it might be desirable to schedule in such a way that the sum throughput at the BS is optimized; or the BS could incorporate some latency constraints, fairness, queue backlog, or include some constraints on the energy consumption. The techniques disclosed here are independent of the choice of the exact optimization criterion.

5.2 Brief Overview of Example Scheduling Embodiments

In some embodiments, FWA implementations are based on two facts: (i) the channel is dominantly time-invariant, with only small variations caused by the time-variant components, and (ii) for scheduling, small variations of the SINR do not impact the performance significantly. The latter effect can be explained by the fact that if the difference between two channels is very large, then a small variation will not alter which channel a user is scheduled on. On the other hand, if the difference between the two channels is small (so that a small variation can "flip" the assignment), then the capacity may not depend on which channel the user is assigned to. Based on these two facts, embodiments of the disclosed technology may perform scheduling based on the channel state information (CSI) of the time-invariant part of the channel only. This approach allows a significant reduction in the amount of pilot tones that need to be transmitted, and allows scheduling to "look into the future".

Since the scheduling is based on the time-invariant part of the channel, the term scheduling henceforth relates mostly to the assignment of appropriate subbands (frequency resources) of the channel, as well as possible spatial (antenna/beam) resources. However, since the assigned spectral resources are dedicated to a user only for a particular time, embodiments may still include time-frequency scheduling. Note that the time scheduling may not materially change the SNR (it may, however, impact latency).

Embodiments of the disclosed technology include optimizing scheduling based on the SINR. In practical deployments, one particular important case of interference is the inter-beam interference, in particular when no precoding is being used. Due to frequency-selective fading, the interference from one beam (user) to another might be less pronounced at certain frequencies, which should then naturally be used to pair those users for simultaneous transmissions in adjacent bands.

5.3 Example Embodiments for Scheduling for the Future

In some embodiments, there may be multiple reasons why the BS might want to know the scheduling decisions in advance, e.g., x ms before the actual transmission (typically, x=5 ms). For example, in order to obtain the best beamforming performance with reciprocity-based beamforming schemes, the BS may perform "channel tracking" for an extended time so that the BS can optimally extrapolate the channel for the actual transmission time. However, if the scheduling is not known in advance, then the system has to track every UE for every possible transmission band all the time, leading to a possibly excessive overhead for pilot consumption. If the scheduling is known in advance, then the UE can send pilots only in the 5 ms preceding the actual downlink data transmission, and only in the subband in which the UE will be scheduled.

Thus, in some embodiments, for the downlink, the BS may buffer the data for a pre-specified (e.g., 5 ms) interval, but does the scheduling decisions based on the time-invariant CSI right away. In this manner, the system has complete knowledge of the transmissions (which data, which subband, etc.) for the future; this principle may also be extended to information exchange between different BSs, which may coordinate transmissions to avoid interference between the different BSs for avoidance of intercell interference.

In some MU-MIMO system embodiments, the scheduling may be connected to the beamforming. In the case of a simple system with geometric beams only, the scheduling should be done in order to keep low the inter-user interference, created between the users on the different bands. This scheduling problem may be solved with efficient algorithms, possibly in real-time. For the case of precoding where the beamforming vectors are adaptive, each different scheduling may result in a different beamformer. Thus, real-time computation of the optimum beamformers may be challenging. With the disclosed approach of doing beamforming based on time-invariant CSI, "approximate" beamformers and the resulting SINRs can be precomputed for all possible scheduling combinations. These results can then be stored, and during actual operation, the schedulers (for a given user demand) can be just read out from the lookup table Note that after the scheduling has been thus established, the BS may still compute the actual beamformer based on the (extrapolated) instantaneous CSI, in order to obtain a high SINR. It may be noted that the computational effort for finding a suitable beamformer for given scheduling is relatively low.

Note that a scheduler that schedules "in advance" may on purpose leave some "holes" for quick scheduling of low-latency data. If the spectral resources are not used because no low-latency data is pending for transmission, then the scheduler can schedule data that normally would be transmitted with delay for immediate transmission. This might then entail the use of a "safety margin" since the history is not available for exact extrapolation, but it is still better than leaving a transmission resource such as a physical resource block (PRB) empty. The data transmitted in that slot need not be "out of sequence". Some embodiments may be not operate such spontaneous scheduling to change the user assignment to a particular TF resource for the next 5 ms, but may change the data that are transmitted to/by a particular user without impacting the basic operation of the scheme.

5.4 Example Embodiments for Uplink Pilot Reuse and Scheduling

In some embodiments, the uplink pilots in general are orthogonal to each other so that the BS can estimate the channels separately as the basis for the beamformers that can then separate the different users. However, in the FWA channel, this constraint may be relaxed. A BS may know which channels show essentially no interference with each other (e.g., based on the time-invariant part), so that the existence of a time-variant part can decrease the pilot SNR no lower than the temporal Rice factor. Additionally, embodiments may make use of the second-order statistics of the time-variant part. In other words, the angular power spectrum of the time-variant part is known (or at least estimated). Some embodiments may assume a particular pilot scheduling, and subsequently estimate the resulting channel SNR.

In some embodiments, there may be a tradeoff involved in the choice of the "separation interval" between the users: make it too small, and the inter-user interference will negatively impact the per-link capacity; make it too large, and the number of users that can be served simultaneously is insufficient. It may be impractical to having a fixed beam interval between different users. In reality, the choice of which beams can be served simultaneously has to be done dynamically based on the second-order statistics.

5.5 Example Embodiments for MU-MIMO User Combinations

In some embodiments, when both the BS and the MS have multiple antenna elements, then one way of exploiting those is to transmit multiple data streams to/from the same user, and let the receiver sort out those streams through some form of multi-stream detection (joint maximum likelihood, MMSE+SIC, and so on). For the uplink, it is usually (from a sum-throughput perspective) preferable to have different users transmit; for example, if users A and B are present, it may be preferable to have each of them transmit one data stream in two subsequent timeslots, rather than have user A transmit two datastreams in the first timeslot, and user B two datastreams in the second timeslot. The reason is that the condition number of the propagation channel is worse for the transmission from a single user (whose antennas are naturally close together) than for two users that are widely separated. For the downlink case without precoding, the situation is not quite as obvious, as the transmissions in both cases would occur from the same set of antennas (e.g., the BS antennas), and the ability to separate out the users depends on the channel from the BS antennas to the antennas of each specific user that does the decoding. With precoding, it is possible to use the BS antennas to suppress interference to a particular user, and exploit the degrees of freedom of the receiver to enhance performance either by providing additional suppression of the inter-stream interference, or suppress interference from out-of-cell users.

In some embodiments, the time-invariant part of the CSI may be used to determine which users should be scheduled to operate at the same time, e.g., which user combinations will provide most easily a high-rank channel. While this may result in a small performance loss, it has the advantage that the combination decisions can be made one (offline), and remain valid, essentially, for an unlimited time duration

5.6 Example Embodiments for Adaptive Transmission Schemes

While opportunistic scheduling provides better performances in many circumstances, there are numerous situations in which full spreading over the available bandwidth is desired. In some embodiments, FWA systems may operate in this manner when the performance is strongly impacted by inter-cell interference, and no coordination between the scheduling at different BSs is possible or desired. In this case, the averaging of the interference achieved by full spreading is desired. Since in a practical deployment, implementations often face a situation in which some users (near the cell edge) are interference limited, while others (near the cell center) are not, such embodiments may use an adaptive scheme that performs spreading or opportunistic scheduling based on either the location within the cell, the long-term average of the relative importance of (unschedulable) interference, or possible a short-term relative importance of this interference.

6. Example Embodiments for Modulation and Beamforming

While the time-invariant part of the channel can be handled as described above, there are still residual time variations due to moving objects, which might possibly affect the SNR and thus the throughput. In some embodiments, it is thus advantageous to use delay-Doppler domain modulations such as the OTFS in combination with the above-described schemes. However, other modulation methods (like OFDM) could be used just as well for performance improvement compared to regular OFDM systems (though in most cases OTFS will give the superior absolute performance).

7. Example Embodiments for Channel Hardening

In some embodiments, massive MIMO is based on the orthogonality between the users being retained for essentially any beamforming vectors, as long as they are independent, and the antenna arrays are large. This approach is based on the fact that any two independent Gaussian random vectors are orthogonal to each other as the length of the vector goes to infinity. Practical implementations have shown that this does not work well in practice, even with large arrays, e.g., the residual inter-user interference is too large. Embodiments of the disclosed technology may be used to design the beamforming vectors to achieve strict orthogonality with respect to their time-invariant channel parts, and use the massive MIMO principle to approximately orthogonalize the contributions that are time-variant. It must be noted that using this time-invariant part for orthogonalization is different from doing a physical, sector-based orthogonalization, which relies in the directions and would remain valid for a moving UE. Rather, this approach is orthogonalization based on the time-invariant part that could be valid even for overlapping angular spectra.

8. Example System Designs

Embodiments of the disclosed technology may be implemented in a number of different combinations, and which may include the following:

8.1 Example Systems based on Different Types of Data

In some embodiments, data may be divided into different types, based on usage case such as the expected latency for the data:

(1) No-history data: data to/from a user where the last transmission is more in the past than the prediction horizon of the channel.

(A) latency requirement <1 ms: grant-less access in the UL, transmission in the DL done with beamforming based on time-invariant CSI (TI-CSI).

(B) latency requirement between 1 and 5 ms: scheduled access in the UL, beamforming with partial TI-CSI (PTI-CSI) in DL. One reason to use partial (rather than full) TI-CSI is because there may not be sufficient history for an accurate prediction.

(C) latency requirement >=5 ms: scheduled access in UL, scheduled access with extrapolated instantaneous CSI in DL and making use of a buffer at the BS.

(2) Data with history: in principle, scheduling can be done based on instantaneous extrapolated CSI. However, this would require scheduling algorithm to finish computations within a time interval that is far less than the prediction horizon; this is thus mainly applicable for BSs with very high computational capability.

8.2 Example Uplink Procedures

In some embodiments, is may be assumed that a PRB is the basic unit for subbanding, and that the coherence bandwidth is so large that no significant channel changes occur within the bandwidth of the PRB. It may further be assumed that for the UL, no buffering of the data occurs (though there could be advantages to that strategy, see below).

Option 1: Split bandwidth into two parts: one part (which could consist of several, widely separated subbands), is used for transmission of grant requests and type 1A data. Transmission may be done with a multiple-access format that allows proper reception even when multiple users are on the air, for example CDMA. The modulation may spread the signal over all the subbands assigned to this type of data, e.g., with OTFS, to obtain maximum robustness to fading. Note that no multi-user diversity is available for these users, since the data are transmitted in a fixed band. Transmission of the scheduled users is happening in the other band.

Option 2: No splitting of the bands occurs. Each UE monitors the DL grant transmitted by the BS on a broadcast channel, and thus knows what the "empty" slots are. UEs transmit grant requests or type 1A data in the "holes" (the BS scheduler has to ensure that sufficient empty subbands are available in each UL timeslot so that (in a statistical sense) the UEs can transmit this information.

In either case, the BS assigns the subbands for the scheduled uplinks based on the TI-CSI (there is no point for the BS to try and take the "best channels" for the type 1a data into account, since it does not know which users want to transmit). The scheduler may try to:

(1) maximize the throughput—this is related to the SINR, as well as channel rank—that can be achieved with a particular scheduling;

(2) avoid sending "extra" reciprocity pilots, as this leads to unnecessary overhead. In some embodiments, the "extra" pilots may include pilots transmitted from a UE in a particular subband that are not associated with data. Such extra pilots can be avoided if the UE needs to send UL data anyway. In that case, it may be sent on the frequency band on which it is scheduled for the downlink as well. The optimization works best if the BS knows "into the future" whether a particular UE will have data to send; however this may require that the UE also performs buffering of the UL data. This may be one use of buffering data at the UE, though this might not be desirable for low-cost UEs; and/or (3) optimize according to some other criterion, e.g., taking into account the latency requirements for different users, or other quality-of-experience measures.

In any case, the modulation may occur by implementing OTFS spreading along the time axis, as well as between the different PRBs along the frequency axis, and possibly within each PRB. Alternatively, OFDM or other multicarrier schemes, or other modulation formats may be used.

In some embodiments, packets of type 1b may need to be included in scheduled bands (to exploit multi-user diversity), but are included so as to not create interference to the other users. In other words, the beamformer always has to lie in the nullspace of the "known" (type 1c, 2) channels. This ensures no interference from the type 1b channels (with imperfectly known channel, due to extrapolation errors) to the known channels. However, there will be interference from the known channel to the type 1b channel; this has to be accounted for by introducing a safety margin in the choice of the modulation and coding scheme.

8.3 Examples of Pilot Orthogonality

In some embodiments, MU-MIMO may support multiple users in the same PRB. Pilot reuse is planned based on the TI-CSI, with safety margins, as discussed above. The required thresholds and margins need to be determined based on simulations or analytical computations, and will depend on the modulation format. These considerations also hold for reciprocity pilots. They also hold for data transmission in the DL (see below) when no precoding based on instantaneous CSI is possible.

In some embodiments, the use of reciprocity pilots should be adaptive, so that channels that do not experience time variations (as the UE can determine from the observation of DL pilots) do not need training of the history of the channel for DL beamforming.

8.4 Example Downlink Procedures

Category 1a, b data: schedule data right away, use TI-CSI for beamformer, stay orthogonal to the known channels, and use a safety margin for the target channel.

Category 1c data: beamform based on history, if that history is available in a "free" subband, transmit packet immediately. If no history available in a free subband, use same strategy as for category 1a data.

Category 2 data: perform the following steps
(1) buffer incoming data;
(2) schedule data coming in at t=0 for transmission at t=5 ms, and assign subband(s) based on TI-CSI;
(3) request reciprocity pilots from target UEs in the assigned subbands;
(4) monitor pilots, at t=5 ms extrapolate channel and beamform based on that; and
(5) transmit PRBs based on that beamformer.
Modulation: same as in the example uplink procedures.

9. Example Methods for Using Quasi-Static Properties of Wireless Channels

One exemplary method of using quasi-static properties of a wireless channel includes estimating a first portion of a transmission channel to a far end communication apparatus as a time-invariant transmission channel, estimating a second portion of the transmission channel to the far end communication apparatus as a time-variant transmission channel, where the estimating the second portion is performed more frequently than the estimating the first portion, and performing digital communication based on channel information that is obtained by combining the first portion and the second portion.

In some embodiments, the method may include the first portion of the transmission channel being estimated using a first set of pilots that are transmitted based on a property of the time-invariant transmission channel.

In some embodiments, the method may include the wireless communication apparatus being a base station, and where the combining the first portion and the second portion includes interpolating and/or extrapolating the estimated transmission channels.

In some embodiments of the method, estimating the second portion may include performing channel estimation based on a received signal to obtain a channel estimate and subtracting contribution of the time-invariant transmission channel from the channel estimate to obtain the time-variant transmission channel.

Another exemplary method of using quasi-static properties of a wireless channel includes estimating, for each of multiple UEs, a channel factor indicative of time-invariance of a wireless channel between a base station and a corresponding UE, classifying the multiple UEs into at least two groups based on values of the channel factors, and assigning different amount of transmission resources to pilot signal transmissions in the wireless communication system to each group based on the values of the channel factors for UEs in that group.

In some embodiments of the method, the channel factor includes a Rice factor that is a ratio of a total sum power of time-invariant components to a total sum power of time-variant components.

In some embodiments of the method, assigning different amount of transmission resources to pilot signal transmissions includes assigning more pilot transmission resources to a first UE having a lower Rice factor compared to a second UE having a higher Rice factor compared to that of the first UE.

Yet another exemplary method of using quasi-static properties of a wireless channel includes estimating, for each UE, a time-invariant part and a time-variant part of a wireless communication channel from the base station to the UE, and scheduling data transmissions from the base station to the UE based on the time-invariant part of the wireless communication channel from the UE, irrespective of the time-variant part.

In some embodiments, the method includes buffering, in a buffer at the base station, data for transmission to the UE.

In some embodiments, a size of the buffer is dependent on a latency requirement.

Figure 7:
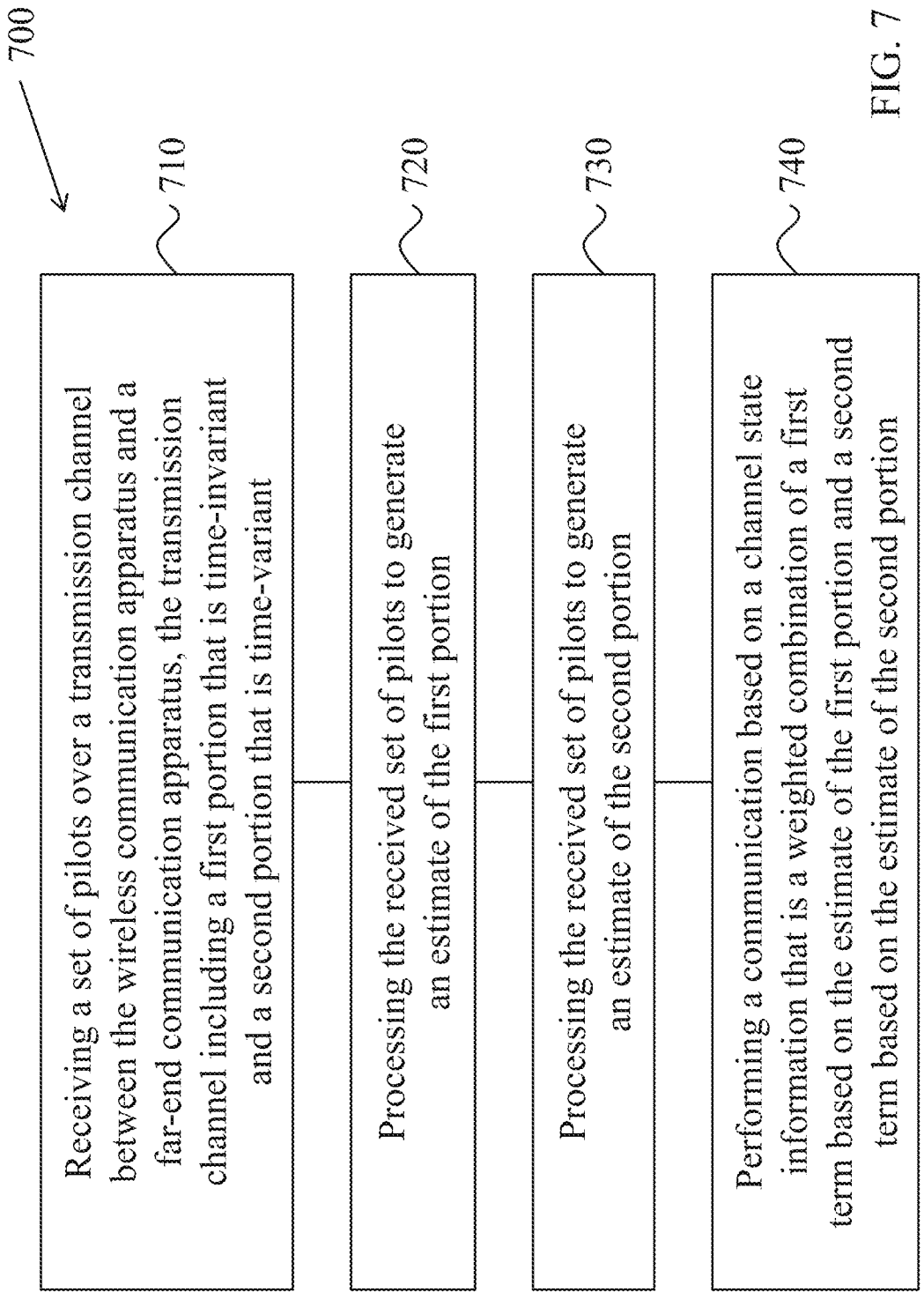
FIG. 7 is a flowchart representation of an example of a wireless communication method that uses quasi-static properties of wireless channels.

FIG. 7 is a flowchart representation of an example of a wireless communication method 700 that uses quasi-static properties of wireless channels. The method 700 includes, at step 710, receiving a set of pilots over a transmission channel between the wireless communication apparatus and a far-end communication apparatus, where the transmission channel includes a first portion that is time-invariant and a second portion that is time-variant.

The method 700 includes, at step 720, processing the received set of pilots to generate an estimate of the first portion, and at step 730, processing the received set of pilots to generate an estimate of the second portion.

The method 700 includes, at step 740, performing a communication based on a channel state information that is a weighted combination of a first term based on the estimate of the first portion and a second term based on the estimate of the second portion. For example, the first term may be a time average of the estimate of the first portion, or a quantized version, or an approximation that rounds off an estimate to a nearest value in a table, and so on. Similarly, the second term may similarly be obtained after further processing of the estimate of the second portion.

In the context of Section 2.2, "Example Embodiments for Channel Estimation in FWA Systems," and in some embodiments, the first portion may be estimated based on an average of measurements of the transmission channel at different times. In other embodiments, the estimate of the first portion is generated based on Doppler filtering of estimates of the transmission channel at different times. In yet other embodiments, the estimate of the first portion is generated using phase noise compensation techniques.

In the context of Section 2.1, "Example Embodiments for Channel Estimation in Mobile Systems," and in some embodiments, the wireless communication apparatus may be a base station, and processing the received set of pilots to generate the estimate of the second portion may include interpolating and/or extrapolating the estimate of the second portion. In other embodiments, the interpolating and/or extrapolating the estimate of the second portion may be based on minimum mean-square error (MMSE) filtering or sparse-estimation signal processing.

In the context of Section 3, "Example Embodiments for Pilot Overhead Reduction," and in some embodiments, processing the received set of pilots to generate the estimate of the second portion may include performing channel estimation on a received signal to generate a channel estimate, and subtracting a contribution of the first portion from the channel estimate to generate the estimate of the second portion. In other embodiments, the wireless system may include multiple transmission channels, each of which is between the wireless communication apparatus and a corresponding one of multiple far-end apparatuses, and each of the transmission channels may be estimated based on different pilot and/or reference signals assigned to the corresponding far-end apparatus. In yet other embodiments, each of the different pilot signals is supported in a delay-Doppler plane, and at least a portion of the delay-Doppler plane supporting a first pilot signal does not overlap the delay-Doppler plane supporting a second pilot signal. In other words, the support for each of the different pilot signals may be non-overlapping or partially overlapping.

In the context of Section 2, "Example Embodiments for Channel Estimation" and Section 3, "Example Embodiments for Pilot Overhead Reduction," and in some embodiments, different pilot signals from the corresponding far-end communication apparatus received at the wireless communication apparatus may have a pairwise non-zero correlation among each other. In other embodiments, a transmission of the different pilot signals from the corresponding far-end communication apparatus may be configured such that the different pilot signals received at the wireless communication apparatus comprise corresponding first portions that are orthogonal to each other.

In yet other embodiments, the corresponding first portions may overlap with one or more of the corresponding second portions. In yet other embodiments, an estimate of the transmission channel between the wireless communication apparatus and one far-end communication apparatus may be generated based on subtracting the pilot signal corresponding to the first portion for the plurality of far-end communication apparatuses, excluding the one far-end communication apparatus, from an overall received signal. In other words, the contribution of all other channels are subtracted from the received signal to generate the channel for a specific wireless apparatus.

In the context of Section 5, "Example Embodiments for Scheduling in FWA Systems," and in some embodiments, a transmission of the different pilot signals from the corresponding far-end communication apparatuses may be configured such that interference due to the different pilot signals received at the wireless communication apparatus is within a specified tolerance. In other embodiments, an estimate of the interference may be generated based on (i) an estimate of the phase noise of one or more of the wireless communication apparatus and the corresponding far-end communication apparatuses, and (ii) an arrangement of transmit pilot tones.

In the context of Section 4, "Example Alternative Embodiments for Pilot Overhead Reduction," the wireless system may include multiple transmission channels, each of which is between the wireless communication apparatus and a corresponding one of multiple far-end apparatuses. In some embodiments, the method 700 may further include estimating, for each of the plurality of far-end communication apparatuses, a channel factor, wherein the channel factor is based on a ratio between a metric associated with the estimate of the first portion and a metric associated with the estimate of the second portion, classifying the plurality of far-end communication apparatuses into at least two groups based on values of the channel factor for each of the plurality of far-end communication apparatuses, and assigning different amount of transmission resources to pilot signal transmissions in the wireless communication system to each group based on the values of the channel factors for the far-end communication apparatuses in that group. In other embodiments, the channel factor is a Rice factor, which is defined as a ratio of a total sum power of first portions to a total sum power of second portions. In yet other embodiments, the assigning different amount of transmission resources to pilot signal transmissions includes assigning more pilot transmission resources to a first far-end communication apparatus having a lower Rice factor compared to a second far-end communication apparatus having a higher Rice factor compared to that of the first far-end communication apparatus.

In the context of Section 5, "Example Embodiments for Scheduling in FWA Systems," the wireless system may include multiple transmission channels, each of which is between the wireless communication apparatus and a corresponding one of multiple far-end apparatuses. In some embodiments, the method 700 may further include scheduling data transmissions from the wireless communication apparatus to each of the plurality of far-end communication apparatuses based on the first portion of the corresponding transmission channel.

In the context of Section 5.4, "Example Embodiments for Uplink Pilot Reuse and Scheduling," and in some embodiments, the scheduling the data transmissions is further based on statistical properties of the second portion of the corresponding transmission channel.

In the context of Section 8.1, "Example Systems based on Different Types of Data" and Section 8.2, "Example Uplink Procedures," and in some embodiments, the method 700 further includes buffering data for the data transmissions. In other embodiments, a time for which the data is buffered is based on latency requirements. In yet other embodiments, the data transmissions are performed based on channel estimates for the second portion based on pilot tones, in conjunction with estimates of the first portion.

In some embodiments, the wireless communication apparatus initiates transmission of pilot tones subsequent to the scheduling, and performs data transmissions based on channel estimates obtained from the pilot tones. In other embodiments, another set of data, different from the scheduled data transmissions, is transmitted in separate time/frequency resources without buffering. In yet other embodiments, another set of data transmissions, different from the scheduled data transmissions, is transmitted in separate time/frequency resources with reduced buffering requirements.

In the context of Section 5.3, "Example Embodiments for Scheduling for the Future" and Section 5.5, "Example Embodiments for MU-MIMO User Combinations," the wireless communication system is a multi-user multiple-input multiple-output (MU-MIMO) system. In some embodiments, the method 700 further includes computing preliminary precoding vectors based on the first portion, and determining beamforming information based on the preliminary precoding vectors, where the scheduling is based on the beamforming information. In other embodiments, computing the preliminary precoding vectors is further based on statistical properties of the second portion. In yet other embodiments, the beamforming information is placed in a lookup table, and retrieved for user combinations to be scheduled during real-time operation.

In some embodiments, the data transmissions are performed using Orthogonal Time Frequency Space (OTFS) modulation.

In some embodiments, the set of pilots comprises a first group of pilots and a second group of pilots, and wherein the first group of pilots is transmitted with a periodicity greater than that of the second group of pilots.

In some embodiments, the wireless communication apparatus may be an access point, and the far-end communication apparatus may be a user equipment (UE). In other embodiments, the wireless communication apparatus may be a UE, and the far-end communication apparatus may be an access point.

In some embodiments, a wireless transceiver apparatus may implement a method of transmitting pilot signals as described in the present document. The method may include, for example, transmitting different groups of pilot signals within the totality of pilot signals with different periodicity to enable estimation of both components of a quasi-static communication channel.

Figure 8:
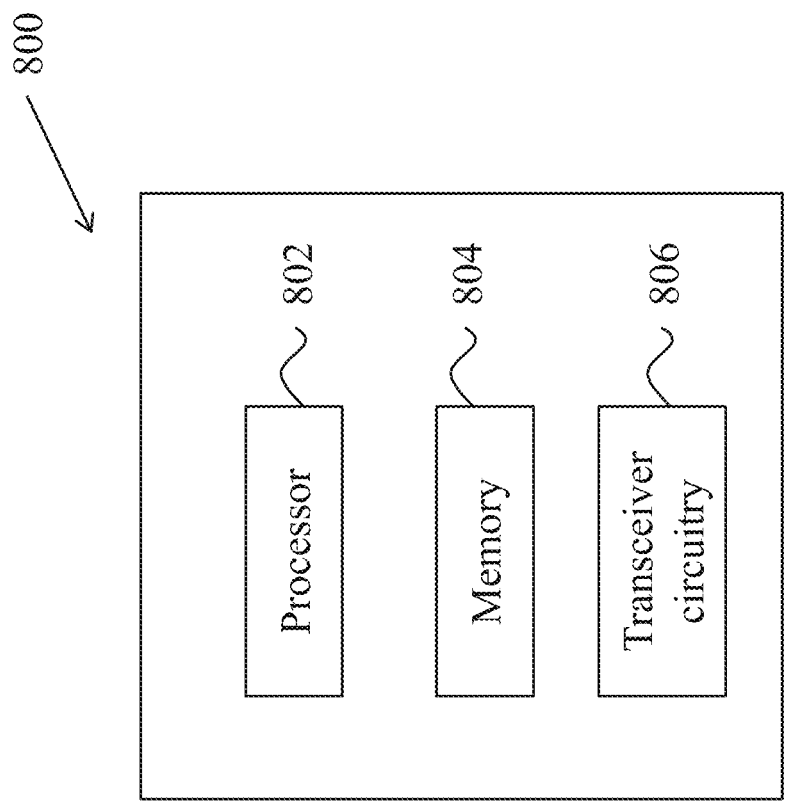
FIG. 8 is a block diagram representation of a portion of an apparatus that may implement a method or technique described in this patent document.

FIG. 8 shows an example of a wireless transceiver apparatus 800. The apparatus 800 may be used to implement any method (e.g. methods 700) or technique described in this document. The apparatus 800 includes a processor 802, a memory 804 that stores processor-executable instructions and data during computations performed by the processor. The apparatus 800 includes reception and/or transmission circuitry 806, e.g., including radio frequency operations for receiving or transmitting signal and/or receiving data or information bits for transmission over a wireless network.

It will be appreciated that the disclosed methods, systems and devices are useful in wireless communication by using quasi-static properties of a wireless channel to improve communication performance.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system for wireless communication, comprising:
a wireless communication apparatus; and
a plurality of far-end communication apparatuses,
wherein the wireless communication apparatus is configured to communicate with each of the plurality of far-end communication apparatuses over a corresponding wireless channel of a plurality of wireless channels, and
wherein the wireless communication apparatus is further configured to:
receive a set of pilots over the corresponding wireless channel between the wireless communication apparatus and a respective far-end communication apparatus, the corresponding wireless channel including a first portion that is time-invariant and a second portion that is time-variant, process the received set of pilots to generate an estimate of the first portion, process the received set of pilots to generate an estimate of the second portion, schedule a plurality of data transmissions from the wireless communication apparatus to each of the plurality of far-end communication apparatuses based on the first portion of the corresponding wireless channel, and perform at least one of the plurality of data transmissions based on a channel state information that is a weighted combination of a first term based on the estimate of the first portion and a second term based on the estimate of the second portion.

2. The system of claim 1, wherein the scheduling the data transmissions is further based on statistical properties of the second portion of the corresponding transmission channel.

3. The system of claim 1, wherein the wireless communication apparatus is further configured to:

buffer data for the data transmissions.

4. The system of claim 3, wherein a time at which the data is buffered is based on latency requirements.

5. The system of claim 3, wherein the data transmissions are performed based on channel estimates for the second portion, which are based on pilot tones, in conjunction with the estimates of the first portion.

6. The system of claim 3, wherein the wireless communication apparatus initiates transmission of pilot tones subsequent to the scheduling, and performs data transmissions based on channel estimates obtained from the pilot tones.

7. The system of claim 3, wherein another set of data, different from the scheduled data transmissions, is transmitted in separate time/frequency resources without the buffering.

8. The system of claim 3, wherein another set of data transmissions, different from the scheduled data transmissions, is transmitted in separate time/frequency resources with reduced buffering requirements.

9. The system of claim 1, wherein the wireless communication system is a multi-user multiple-input multiple-output (MU-MIMO) system, and wherein the wireless communication apparatus is further configured to:

compute preliminary precoding vectors based on the first portion; and determine beamforming information based on the preliminary precoding vectors, wherein the scheduling is based on the beamforming information.

10. The system of claim 9, wherein computing the preliminary precoding vectors is further based on statistical properties of the second portion.

11. The system of claim 9, wherein the beamforming information is placed in a lookup table, and retrieved for user combinations to be scheduled during real-time operation.

12. The system of claim 1, wherein the plurality of data transmissions is performed using an Orthogonal Time Frequency Space (OTFS) modulation.

13. A method for wireless communication, implemented at a wireless communication apparatus in a wireless communication system, the wireless communication apparatus being in communication with each of a plurality of far-end communication apparatuses over a corresponding wireless channel of a plurality of wireless channels, the method comprising:

receiving, from a respective far-end communication apparatus of the plurality of far-end communication apparatuses, a set of pilots over a first wireless channel of the plurality of wireless channels, the first wireless channel including a first portion that is time-invariant and a second portion that is time-variant;

processing the received set of pilots to generate an estimate of the first portion;

processing the received set of pilots to generate an estimate of the second portion;

scheduling a plurality of data transmissions from the wireless communication apparatus to each of the plurality of far-end communication apparatuses based on the first portion of the corresponding wireless channel; and performing at least one of the plurality of data communications based on a channel state information that is a weighted combination of a first term based on the estimate of the first portion and a second term based on the estimate of the second portion.

14. The method of claim 13, wherein the scheduling the data transmissions is further based on statistical properties of the second portion of the corresponding transmission channel.

15. The method of claim 13, further comprising:

buffering data for the data transmissions.

16. The method of claim 15, wherein a time at which the data is buffered is based on latency requirements.

17. The method of claim 13, wherein the wireless communication system is a multi-user multiple-input multiple-output (MU-MIMO) system, and wherein the method further comprises:

computing preliminary precoding vectors based on the first portion; and determining beamforming information based on the preliminary precoding vectors, wherein the scheduling is based on the beamforming information.

18. The method of claim 17, wherein computing the preliminary precoding vectors is further based on statistical properties of the second portion.

19. The method of claim 17, wherein the beamforming information is placed in a lookup table, and retrieved for user combinations to be scheduled during real-time operation.

20. The method of claim 13, wherein the plurality of data transmissions is performed using an Orthogonal Time Frequency Space (OTFS) modulation.

* * * * *